United States Patent
Zhang et al.

(10) Patent No.: US 7,698,339 B2
(45) Date of Patent: Apr. 13, 2010

(54) METHOD AND SYSTEM FOR SUMMARIZING A DOCUMENT

(75) Inventors: Benyu Zhang, Beijing (CN); Wei-Ying Ma, Beijing (CN); Zheng Chen, Beijing (CN); Hua-Jun Zeng, Beijing (CN); Dou Shen, Hong Kong (HK)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 10/918,242

(22) Filed: Aug. 13, 2004

(65) Prior Publication Data

US 2006/0036596 A1     Feb. 16, 2006

(51) Int. Cl.
*G06F 17/30*     (2006.01)
(52) U.S. Cl. ....................... 707/755; 715/254
(58) Field of Classification Search ........................ None
See application file for complete search history.

(56) References Cited

U.S. PATENT DOCUMENTS

| | | | |
|---|---|---|---|
| 6,192,360 B1* | 2/2001 | Dumais et al. ................. | 707/6 |
| 6,411,930 B1* | 6/2002 | Burges ........................ | 704/240 |
| 6,868,525 B1* | 3/2005 | Szabo ........................... | 707/3 |
| 7,181,438 B1* | 2/2007 | Szabo ........................... | 707/2 |
| 2002/0016825 A1* | 2/2002 | Uchida et al. ............... | 709/207 |
| 2002/0022956 A1* | 2/2002 | Ukrainczyk et al. ........... | 704/9 |
| 2002/0049868 A1 | 4/2002 | Okada et al. | |
| 2002/0156618 A1 | 10/2002 | Mathur et al. | |
| 2003/0004966 A1* | 1/2003 | Bolle et al. .............. | 707/104.1 |
| 2003/0016250 A1* | 1/2003 | Chang et al. ................. | 345/810 |
| 2003/0163790 A1* | 8/2003 | Murata ........................ | 715/531 |
| 2004/0098385 A1 | 5/2004 | Mayfield et al. | |
| 2004/0225667 A1* | 11/2004 | Hu et al. ..................... | 707/100 |
| 2005/0210009 A1* | 9/2005 | Tran .............................. | 707/3 |
| 2006/0089924 A1* | 4/2006 | Raskutti et al. ................ | 707/1 |

FOREIGN PATENT DOCUMENTS

WO     WO02/37328     5/2002

OTHER PUBLICATIONS

Luhn et al., "The Automatic Creation of Literautre Abstracts", IBM Journal of Research and Development, International Business Machines, Apr. 31, 1958.*
OED.com, Oxford English Dictionary Online, entry for "program", Draft Rev. Jun. 2007, Oxford University Press., p. 1-5. <Retrieved from the web Oct. 9, 2007>.*

(Continued)

*Primary Examiner*—Khanh B Pham
(74) *Attorney, Agent, or Firm*—Perkins Coie LLP (57) ABSTRACT

A method and system for calculating the significance of a sentence within a document is provided. The summarization system calculates the significance of the sentences of a document and selects the most significant sentences as the summary of the document. The summarization system calculates the significance of a sentence based on the "important" words of the document that are contained within the sentence. The summarization system calculates the importance of words of the document using various scoring techniques and then combines the scores to classify a word as important or not important. The summarization system can then be used to identify significant sentences of the document based on the important words that a sentence contains and select significant sentences as a summary of the document.

23 Claims, 11 Drawing Sheets

OTHER PUBLICATIONS

OED.com, Oxford English Dictionary Online, entry for "train" (verb1), 1989, 2nd Ed., Oxford University Press, p. 1-7, <Retrieved from the web Jul. 29, 2008>.*

IEEE, "The Authoritative Dictionary of IEEE Standards Terms", Definition of "storage device", Dec. 2000, IEEE, 7th Ed., p. 1113.*

Donaldson et al, PREBIND and textonomy mining the biomedical literature for protein-protein interactions using a SVM. Mar. 2003, BMC bioinformatics, p. 1-13, <Retrieved from internet Jun. 28, 2009>.*

McKeown et al, "Leveraging a Common Representation for Personalized Search and Summarization in a Medical Digital Library", May 2003, IEEE Computer Society, p. 159-170, <Retrieved from ACM Portal/IEEE Jun. 28, 2009>.*

Han, "Creating a Syntactic Document Ontology", Dec. 2004, Doctor of Philosophy Thesis, Pennsylvania State Univ., 162 pages, <Retrieved from Proquest Jun. 28, 2009>.*

Lewis et al, "RCV1: A New Benchmark Collection for Text Categorization Research", Apr. 2004, Journal of Machine Learning Research, MIT Press, p. 361-397, <Retrieved from ACM Portal>.*

Luhn, et al., "The Automatic Creation of Literature Abstracts," IBM Journal of Research and Development, International Business Machines Corporation, Apr. 1958.

European Patent Search Report for European Patent Application No. EP05107352.6, Microsoft Corporation, Jul. 25, 2006.

Himmelman, D.S. and Chu, J.T., "An Automatic Abstracting Program Employing Stylo-Statistical Techniques and Hierarchical Data Indexing," Proceedings of the 1961 16th ACM National Meeting, 1961 (3 pages).

Zechner, Klaus, "Fast Generation of Abstracts from General Domain Text Corpora by Extracting Relevant Sentences," Proceedings of the 16th Conference on Computational Linguistics, vol. 2, Copenhagen, Denmark, 1996 (5 pages).

Platt, John C., "Sequential Minimal Optimization: A Fast Algorithm for Training Support Vector Machines," Technical Report MSR-TR-98-14, Apr. 21, 1998 (21 pages).

* cited by examiner

METHOD AND SYSTEM FOR SUMMARIZING A DOCUMENT

TECHNICAL FIELD

The described technology relates generally to summarizing a document and particularly to identifying significant sentences within a document.

BACKGROUND

The Internet allows users to access millions of electronic documents, such as electronic mail messages, web pages, memoranda, design specifications, electronic books, and so on. Because of the large number of documents, it can be difficult for users to locate documents of interest. To locate a document, a user may submit search terms to a search engine. The search engine identifies documents that may be related to the search terms and then presents indications of those documents as the search result. When a search result is presented, the search engine may attempt to provide a summary of each document so that the user can quickly determine whether a document is really of interest. Some documents may have an abstract or summary section that can be used by the search engine. Many documents, however, do not have abstracts or summaries. The search engine may automatically generate a summary for such documents. The usefulness of the automatically generated summaries depends in large part on how effectively a summary represents the main concepts of a document.

The automatic summarization of documents could also be used to assist users in processing their electronic mail messages. Many users receive hundreds of electronic mail messages on a daily basis. It can be very time-consuming for a user to access and process each electronic mail message. Indeed, because of the large number of electronic mail messages, it may be difficult for a user to identify an important electronic mail message that may need prompt attention out of all the electronic mail messages of lesser importance. Some electronic mail systems may, when listing messages that have recently arrived, display the first line or two of the message to assist the user in identifying the topic of electronic mail messages. In addition, computing devices with small display areas, such as a cell phone, may shorten electronic mail messages to the first line or two because they cannot effectively display an entire message at one time. The first line or two of the message may, however, not be an effective summary of the message.

It would be desirable to have a technique for automatically generating effective summaries of documents. Such effective summaries would help a user identify documents of interest, organize electronic mail message, view documents on devices with limited display space, and so on.

SUMMARY

A method and system for calculating the significance of a sentence within a document is provided. A summarization system calculates the significance of the sentences of a document and selects the most significant sentences as the summary of the document. The summarization system calculates the significance of a sentence based on the "important" words of the document that are contained within the sentence. The summarization system includes a training system and a classification system. The training system is used to train a classifier to classify words of a document according to their importance to the document. Once the classifier is trained, the classification system can be used to identify important words of a document. The summarization system can then be used to identify significant sentences of the document based on the important words that a sentence contains and select significant sentences as a summary of the document.

DETAILED DESCRIPTION

A method and system for calculating the significance of a sentence within a document is provided. In one embodiment, a summarization system calculates the significance of the sentences of a document and selects the most significant sentences as the summary of the document. The summarization system calculates the significance of a sentence based on the "important" words of the document that are contained within the sentence. The summarization system calculates the importance of words of the document using various scoring techniques and then combines the scores to classify a word as important or not important. The summarization system includes a training system and a classification system. The training system is used to train a classifier to classify words of a document according to their importance to the document. Once the classifier is trained, the classification system can be used to identify important words of a document. The summarization system can then be used to identify significant sentences of the document based on the important words that a sentence contains and select significant sentences as a summary of the document.

To train the classifier, the training system uses multiple scoring techniques to score the importance of words of a set of training documents. Thus, the words of a document may be represented by a feature vector that has one score for each scoring technique. For example, when a training document has the word "telephone," the training system may use four different scoring techniques to generate scores of 0.5, 0.4, 0.3, and 0.5. The training system then represents the word "telephone" by the feature vector of (0.5, 0.4, 0.3, 0.5). The training system then receives an indication of the importance of the word "telephone" to the document. For example, a person can review the document and indicate whether the word "telephone" is important or not important to the document. The training system generates training data that comprises feature vector and importance indicator pairs for the words of the training documents. The training system then trains the classifier using the training data to classify a word as important or not important based on its feature vector. To later classify a word of a document based on importance, the classification system uses the scoring techniques to generate a feature vector for the word. The classification system then uses the classifier to classify the importance of the word based on its feature vector.

In one embodiment, the summarization system may use a Luhn-based algorithm to calculate the significance of sentences of a document. A Luhn-based algorithm calculates the significance of a sentence to a document based on keywords of the document that are contained within the sentence. In particular, a Luhn-based algorithm identifies a portion of the sentence that is bracketed by keywords that are not more than a certain number of non-keywords apart. The significance of a sentence as calculated by a Luhn-based algorithm is a score that reflects the density of keywords within the bracketed portion. The Luhn-based algorithm may calculate the score of the sentence as the ratio of the square of the number of keywords contained in the bracketed portion divided by the number of words within the bracketed portion. (See H. P. Luhn, The Automatic Creation of Literature Abstracts, 2 IBM J. of Res. & Dev. No. 2, 159-65 (April 1958).) The summarization system uses the words identified by the classifier as being important as the keywords for the Luhn-based algorithm. The summarization system then selects the sentences that are most significant to the document as indicated by their scores as the summary of the document.

In one embodiment, the summarization system also uses a Luhn-based algorithm in the scoring techniques used to generate the feature vector for a word. The scoring techniques may differ based on the criterion used to select the keywords for use by the Luhn-based algorithm. For example, one scoring technique may select keywords based on frequency of the words within a document, and another scoring technique may select keywords from the title of the document. Once the keywords are selected, each scoring technique may operate in a similar manner. The scoring techniques use the Luhn-based algorithm to calculate the significance of the sentences of a document using keywords selected by a technique-specific criterion. For example, one scoring technique may select the technique-specific keywords of "cellular," "telephone," and "long-distance," and another scoring technique may select the technique-specific keywords of "cellular" and "telephone." Because the sets of keywords are different, each scoring technique may calculate a different significance score for a sentence. For example, the sentence "The cellular and long-distance telephone systems have been integrated to provide seamless long-distance services" may have a significance score of 0.5 when one set of keywords is used and 0.3 when the other set of keywords is used. The scoring techniques then set a significance score of a technique-specific keyword within a sentence to the significance score of that sentence as calculated by the scoring technique. For example, the frequency-based scoring technique may set the scores of its keywords "cellular," "telephone," and "long-distance" to 0.5 and the title-based scoring technique may set the scores of its keywords "cellular" and "telephone" to 0.3. The summarization system may set the feature vector for "cellular" to (0.5, 0.3), "telephone" to (0.5, 0.3), and "long-distance" to (0.5, 0). The training system uses the feature vectors for the training data to train the classifier, and the classification system uses the feature vectors to identify keywords as important or not important to a document. Since keywords may be contained in different sentences, a keyword may have multiple feature vectors. When in training mode, the training system can use multiple feature vectors for a keyword to train the classifier. When in classification mode, the classifier may classify a keyword as important based on one feature vector for the keyword, and unimportant based on another feature vector. In such a case, the classification system may use a rule (e.g., majority, super-majority, or unanimity) to decide if the keyword is important or not important.

In one embodiment, the summarization system may use various criteria to select keywords of a document for use in applying a Luhn-based algorithm to calculate the significance of the sentences of the document. The summarization system may use a frequency-based criterion to identify the keywords of a document. The summarization system may calculate the frequency of each word within a document and select words within a certain frequency range to be keywords of the document. The use of a frequency range may eliminate words that occur too frequently (e.g., "the") or too infrequently (e.g., only one occurrence) to be important words. For example, if a document contains 1000 words and the word "telephone" occurs in the document 20 times, then its frequency may be .02 (i.e., 20/1000). The frequency range may be set statically, for example, to between 0.01 and 0.03, or dynamically based on the calculated frequencies of the document. The range can be dynamically set, for example, to include only a certain number of keywords. The summarization system may use a title-based criterion to select the keywords of a document. The title-based criterion may select the non-stop words of the title of the document as the keywords. For example, if the title of the document is "An Analysis of Long-Distance Telephone Services," then the keywords would be "analysis," "long-distance," "telephone," and "services." When the document is an electronic mail message, then the subject line of the message may be used as the title. The summarization system may use a named-entity criterion to select keywords. A named entity is a word within a document that can be identified as corresponding to a certain class of entities such as time, number, location, personal name, company name, and so on. For example, an electronic mail message that includes an invitation to a meeting may have the named entities of the time and location of the meeting. The summarization system may use a thread-based criterion to select keywords. Various documents, such as electronic mail messages and discussion groups, may be thread-based in that a reply to an electronic mail message or addition to a discussion group may represent a current posting within a thread of postings. If the current posting of a thread-based document uses a word that was used in a previous posting, then that word may be important to the document. The thread-based criterion selects keywords from the words that occur in the current posting that also occurred in a previous posting (i.e., repeated words).

In one embodiment, the summarization system uses a support vector machine classifier to classify keywords as being important or not important. A support vector machine operates by finding a hyper-surface in the space of possible inputs based on the training data. The hyper-surface attempts to split the positive examples (e.g., feature vector and important pairs) from the negative examples (e.g., feature vector and not important pairs) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~iplatt/smo.html.) Alternatively, the summarization system may use linear regression, logistics regression, and other regression techniques to classify keywords.

Figure 1:
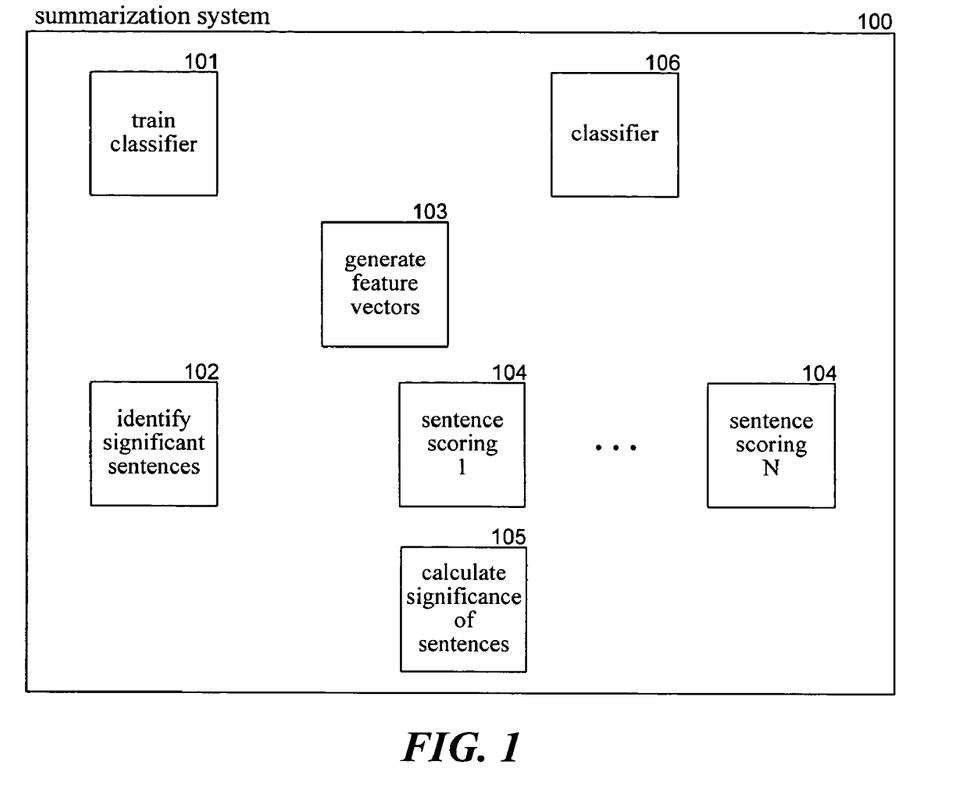
FIG. 1 is a block diagram that illustrates components of the summarization system in one embodiment.

FIG. 1 is a block diagram that illustrates components of the summarization system in one embodiment. The summarization system 100 includes a train classifier component 101, an identify significant sentences component 102, a generate feature vectors component 103, sentence scoring components 104, a calculate significance of sentences component 105, and a classifier 106. The train classifier component inputs training documents and invokes the generate feature vectors component to generate keyword and feature vector pairs and then inputs the importance of the keywords. The training data includes feature vector and importance indicator pairs for keywords of the training documents. The train classifier component then trains the classifier using the training data. The generate feature vectors component invokes the sentence scoring components for each training document to calculate a significance score for each sentence of the training document for each scoring technique. A sentence scoring component implements a scoring technique that uses a specific keyword selection criterion. The sentence scoring components select the technique-specific keywords of a document and invoke the calculate significance of sentences component to calculate significance scores for the sentences of the training document based on the technique-specific keywords. The calculate significance of sentences component may use a Luhn-based algorithm. After the classifier is trained, the identify significant sentences component is used to identify the significant sentences of a document. The identify significant sentences component invokes the generate feature vectors component to generate the feature vectors for the keywords of the document to be classified as important or not important. The identify significant sentences component then invokes the classifier for each feature vector to classify its keyword as important or not important. After the keywords of the document are classified, the identify significant sentences component invokes the calculate significance of sentences component passing the important keywords to calculate the significance of the sentences of the document. The summarization system may select the sentences that are most significant as a summary of the document. The classifier performs the classification of a feature vector. In one embodiment, the classifier is a support vector machine. One skilled in the art will appreciate, however, that various types of classifiers can be used, such as Naive Bayesian, Linear Regression, Logistics Regression, and k Nearest Neighbor ("kNN"). One skilled in the art will also appreciate that scoring techniques other than Luhn-based scoring techniques may be used, such as Latent Semantic Indexing and Supervised Summarization. (See also, Zechner, C., "Fast Generation of Abstracts from General Domain Text Corpora by Extracting Relevant Sentences," Proceedings of the 16th International Conference on Computational Linguistics, pp. 986-989 (1996) and Himmelman, D. and Chu, J., "An Automatic Abstracting Program Employing Stylo-Statistical Techniques and Hierarchical Data Indexing," Proceedings of the 16th ACM National Meeting (1961).)

The computing device on which the summarization system is implemented may include a central processing unit, memory, input devices (e.g., keyboard and pointing devices), output devices (e.g., display devices), and storage devices (e.g., disk drives). The memory and storage devices are computer-readable media that may contain instructions that implement the summarization system. Various communications links may be used, such as the Internet, a local area network, a wide area network, or a point-to-point dial-up connection.

The summarization system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The summarization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
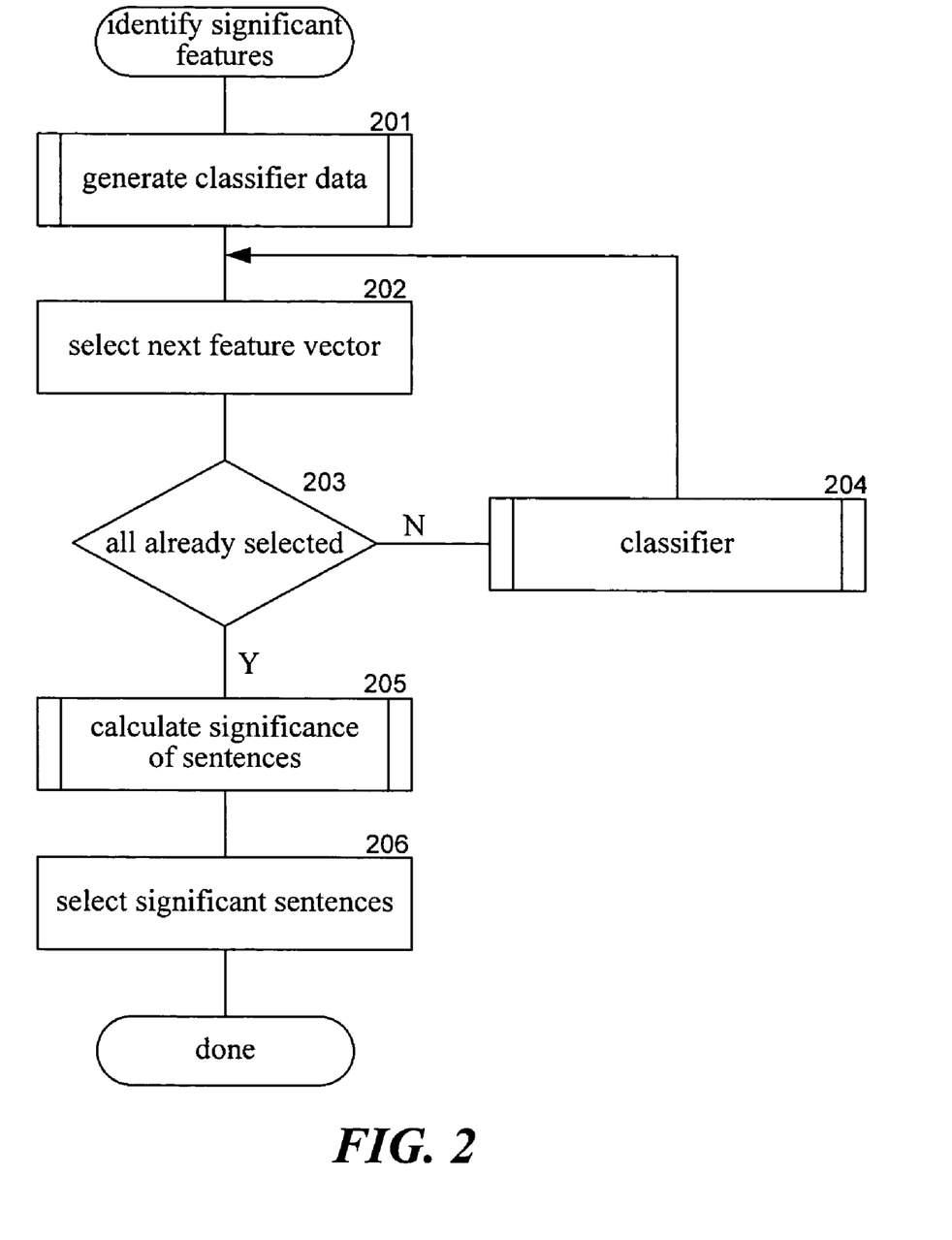
FIG. 2 is a flow diagram that illustrates the processing of the identify significant sentences component in one embodiment.

FIG. 2 is a flow diagram that illustrates the processing of the identify significant sentences component in one embodiment. This component is passed a document and returns an indication of the most significant sentences within the document. In block 201, the component invokes the generate feature vectors component to generate the feature vectors for the keywords of the document. In blocks 202-204, the component loops invoking the classifier for each feature vector to classify the keywords associated with the feature vectors as important or not important. In block 202, the component selects the next feature vector. In decision block 203, if all the feature vectors have already been selected, then the component continues at block 205, else the component continues at block 204. In block 204, the component invokes the classifier for the selected feature vector and then loops to block 202 to select the next feature vector. When a keyword has conflicting importance indicators because of its different feature vectors, the component may use a rule, such as majority rule, to classify the keyword. In block 205, the component invokes the calculate significance of sentences component to generate a significance score for each sentence of the document using the keywords that have been classified as important. In block 206, the component selects the sentences with the highest significance score as the summary of the document and then completes.

Figure 3:
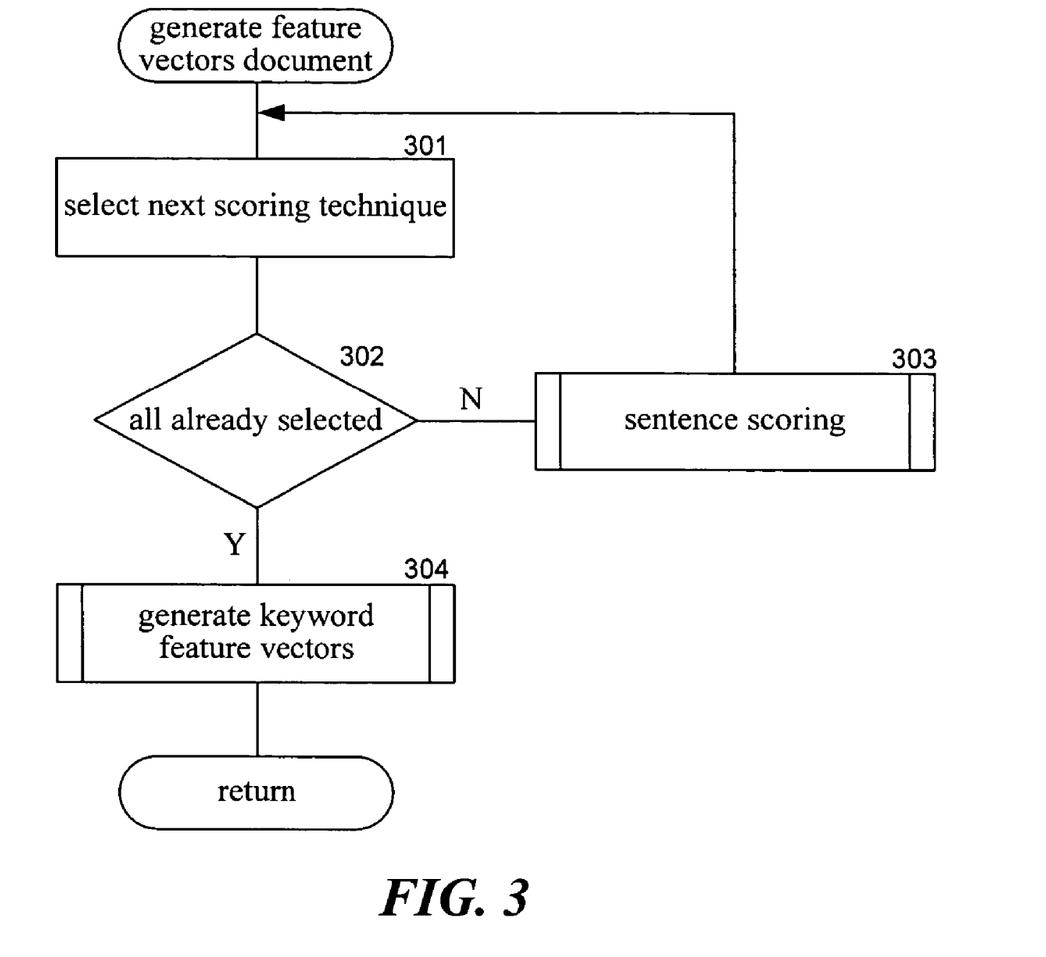
FIG. 3 is a flow diagram that illustrates the processing of the generate feature vectors component in one embodiment.

FIG. 3 is a flow diagram that illustrates the processing of the generate feature vectors component in one embodiment. The component is invoked when in training mode or classification mode and is passed a training document or a document to be summarized. The component returns keyword and feature vector pairs for keywords of the document. The component loops selecting each scoring technique and invoking a component to calculate the significance of the sentences using that scoring technique. In blocks 301-303, the component loops calculating the significance of sentences using the scoring techniques. If four scoring techniques are used, then each sentence will have four scores. In block 301, the component selects the next scoring technique. In decision block 302, if all the scoring techniques have already been selected, then the component continues at block 304, else the component continues at block 303. In block 303, the component invokes a sentence scoring component to calculate technique-specific significances of the sentences of the document using the scoring techniques. The component then loops to block 301 to select the next scoring technique. In block 304, the component invokes a generate keyword feature vectors component to generate a feature vector for each keyword of the document. The component then returns.

Figure 4:
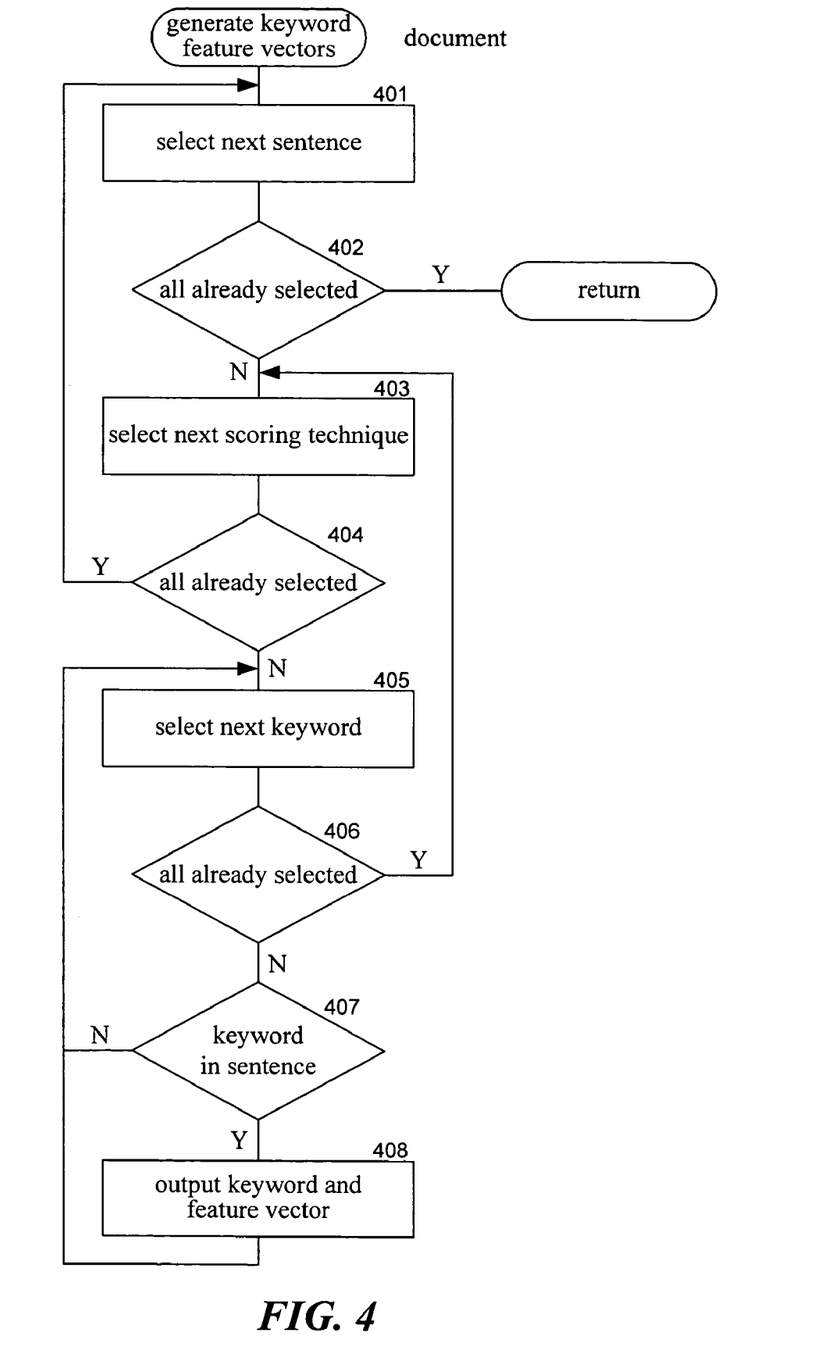
FIG. 4 is a flow diagram that illustrates the processing of the generate keyword feature vectors component in one embodiment.

FIG. 4 is a flow diagram that illustrates the processing of the generate keyword feature vectors component in one embodiment. The component loops selecting sentences of the passed document and selecting the keywords of that sentence for each scoring technique. For each selected keyword, the component then outputs a keyword and feature vector pair. The feature vector includes the significance scores for the selected sentence as calculated by each scoring technique. In block 401, the component selects the next sentence of the document. In decision block 402, if all the sentences of the document have already been selected, then the component returns, else the component continues at block 403. In block 403, the component selects the next scoring technique. In decision block 404, if all the scoring techniques have already been selected for the selected sentence, then the component loops to block 401 to select the next sentence, else the component continues at block 405. In block 405, the component selects the next keyword of the selected sentence for the selected scoring technique. In decision block 406, if all the keywords have already been selected, then the component loops to block 403 to select the next scoring technique, else the component continues at block 407. In decision block 407, if the selected keyword is in the sentence, the component continues at block 408, else the component loops to block 405 to select the next keyword. In block 408, the component outputs the keyword and feature vector pair. The component then loops to block 405 to select the next keyword.

Figure 5:
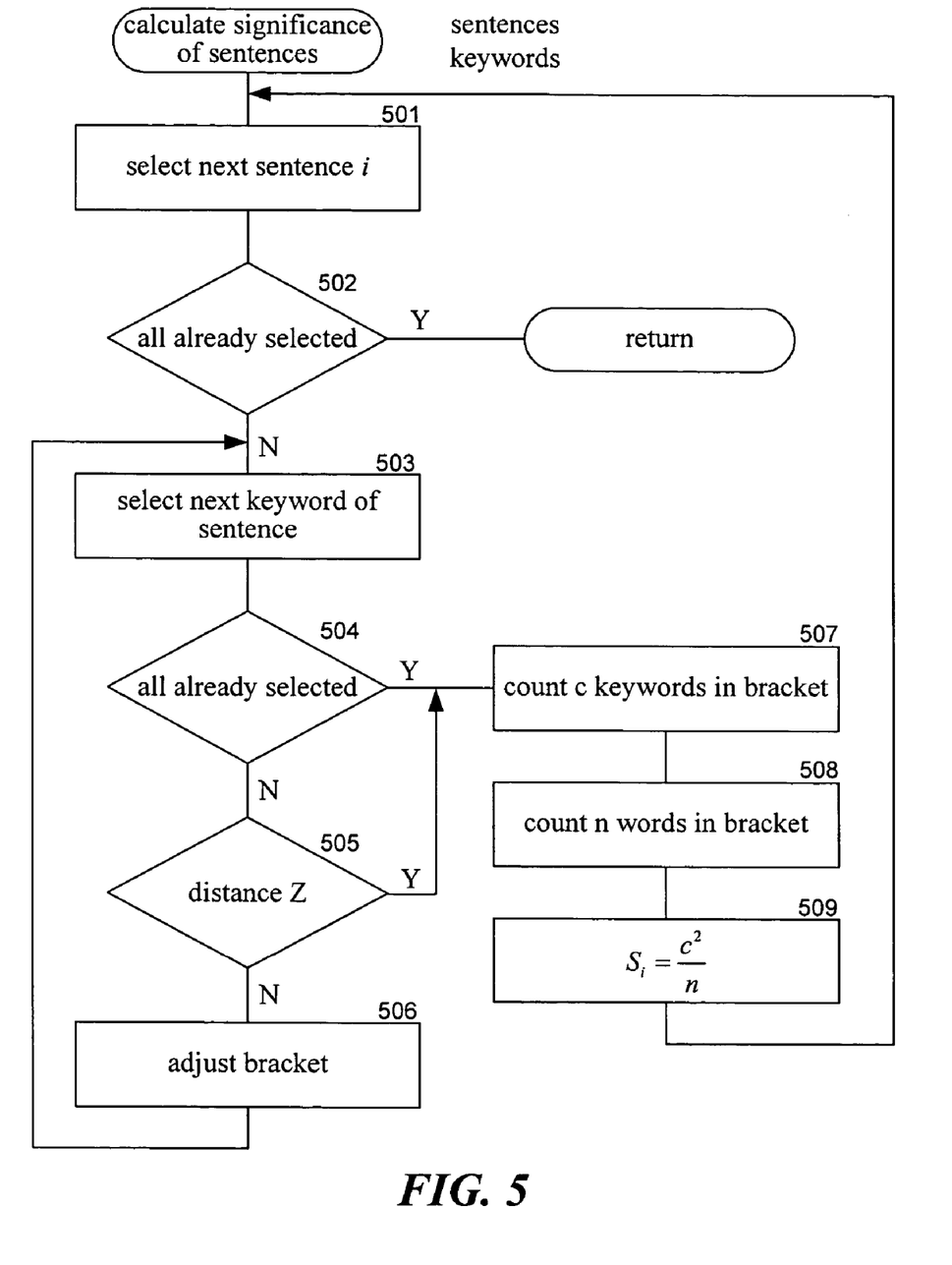
FIG. 5 is a flow diagram that illustrates the processing of the calculate significance of sentences component in one embodiment.

FIG. 5 is a flow diagram that illustrates the processing of the calculate significance of sentences component in one embodiment. The component is passed a document containing sentences along with keywords of the document. The component then applies a Luhn-based algorithm to calculate the significance of each sentence. In block 501, the component selects the next sentence. In decision block 502, if all the sentences have already been selected, then the component returns, else the component continues at block 503. In block 503, the component selects the next keyword of the sentence. In decision block 504, if all the keywords of the sentence have already been selected, then the component continues at block 507, else the component continues at block 505. In decision block 505, if the distance between the selected keyword and the last selected keyword is greater than a limit of words, then the component continues at block 507 to calculate the significance of the selected sentence based on the bracketed keywords, else the component continues at block 506. In block 506, the component adjusts the brackets of the keywords and then loops to block 503 to select the next keyword of the sentence. In block 507, the component counts the number of keywords within the brackets. In block 508, the component counts the number of words within the brackets. In block 509, the component sets the significance of the selected sentence to the square of the number of keywords divided by the number of words within the brackets. The component then loops to block 501 to select the next sentence.

Figure 6:
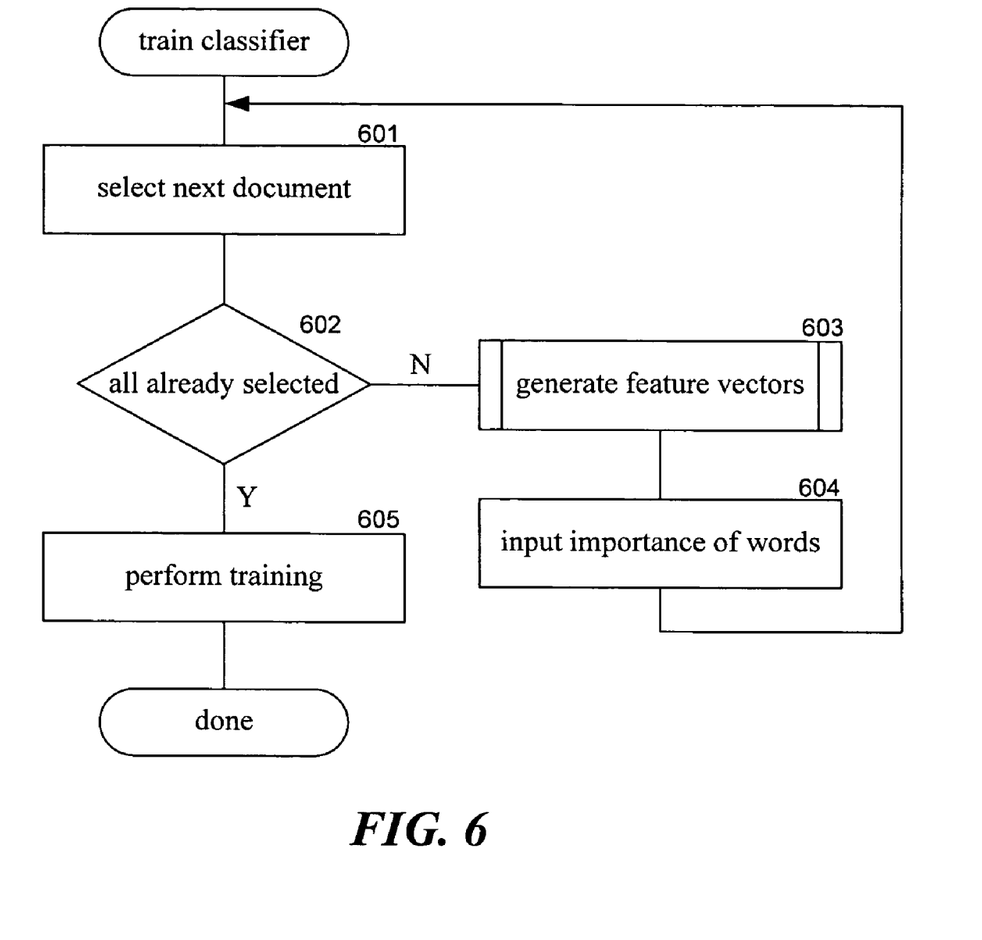
FIG. 6 is a flow diagram that illustrates the processing of the train classifier component in one embodiment.

FIG. 6 is a flow diagram that illustrates the processing of the train classifier component in one embodiment. The component loops generating keyword and feature vector pairs for each document in the training set and then inputting an importance indicator for each keyword in the set of keyword and feature vector pairs. The component then trains the classifier using the feature vector and importance indicator pairs generated for all the documents in the training set. In block 601, the component selects the next training document. In decision block 602, if all the training documents have already been selected, then the component continues at block 605, else the component continues at block 603. In block 603, the component invokes the generate feature vectors component to generate keyword and feature vector pairs for the selected training document. In block 604, the component inputs (e.g., from a person) an indication of whether each keyword is important to the selected document. The component then loops to block 601 to select the next training document. In block 605, the component trains the classifier using the feature vector and importance indicator pairs and then returns.

Figure 7:
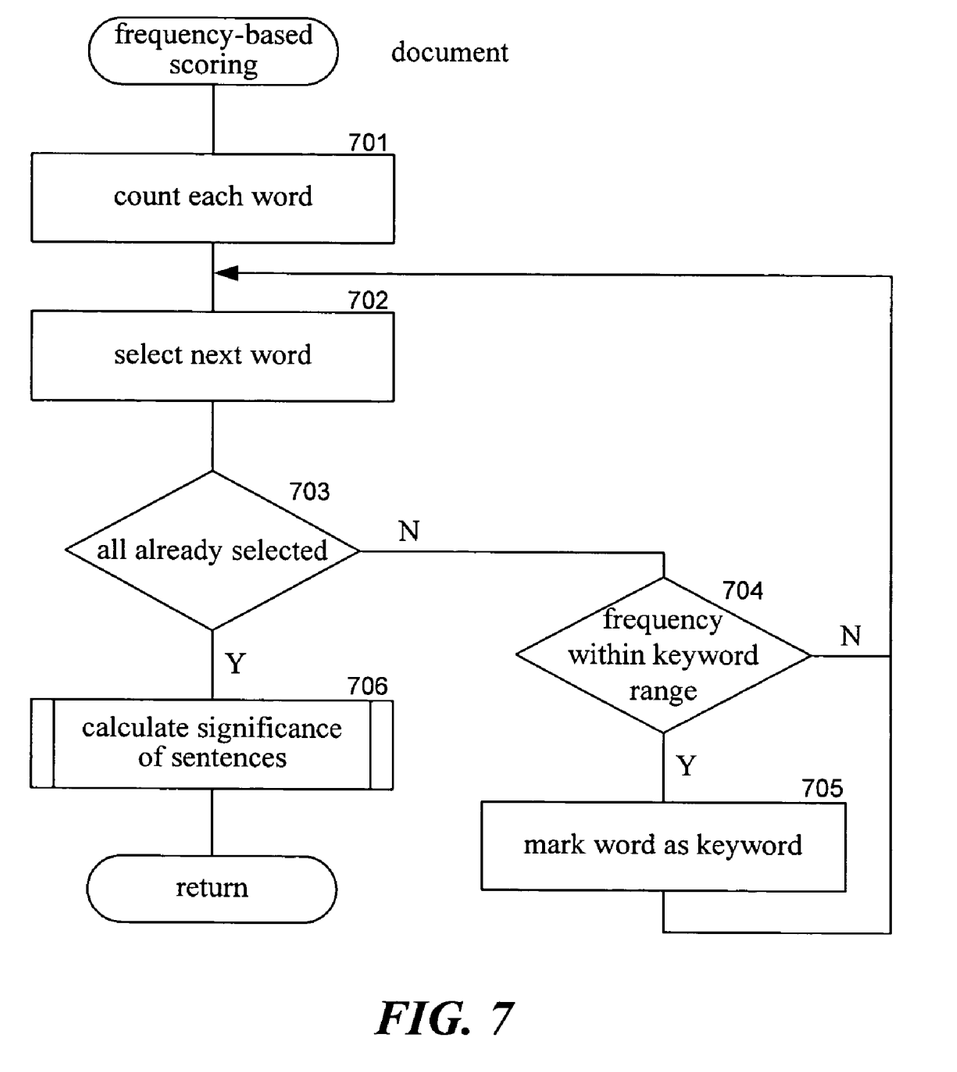
FIG. 7 is a flow diagram that illustrates the processing of a frequency-based scoring technique in one embodiment.

FIG. 7 is a flow diagram that illustrates the processing of a frequency-based scoring technique in one embodiment. The component is passed a document, identifies keywords of the document based on the frequency of the words, and calculates the significance of sentences of the document. In block 701, the component counts each word within the document. In block 702, the component selects the next word of the document. In decision block 703, if all the words have already been selected, then the component continues at block 706, else the component continues at block 704. In decision block 704, if the frequency of the word is within a keyword range, then the component continues at block 705, else the component loops to block 702 to select the next word of the document. In block 705, the component marks the selected word as a keyword and then loops to block 702 to select the next word of the document. In block 706, the component invokes the calculate significance of sentences component to calculate the significance of the sentences of the document using the identified keywords. The component then returns.

Figure 8:
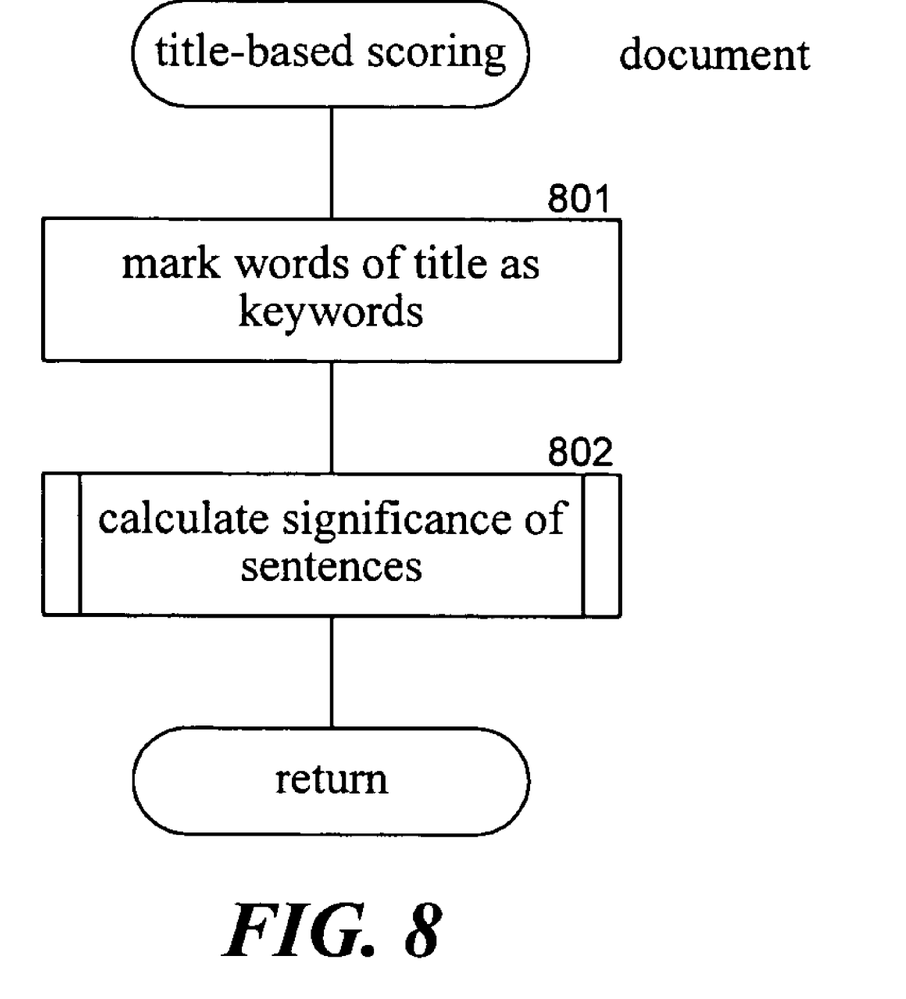
FIG. 8 is a flow diagram that illustrates the processing of a title-based scoring technique in one embodiment.

FIG. 8 is a flow diagram that illustrates the processing of a title-based scoring technique in one embodiment. The component is passed a document, identifies keywords from the title of the document, and calculates the significance of sentences of the document. In block 801, the component marks the non-stop words of the title as keywords. In block 802, the component invokes the calculate significance of sentences component to calculate the significance of the sentences of the document using the identified keywords. The component then returns.

Figure 9:
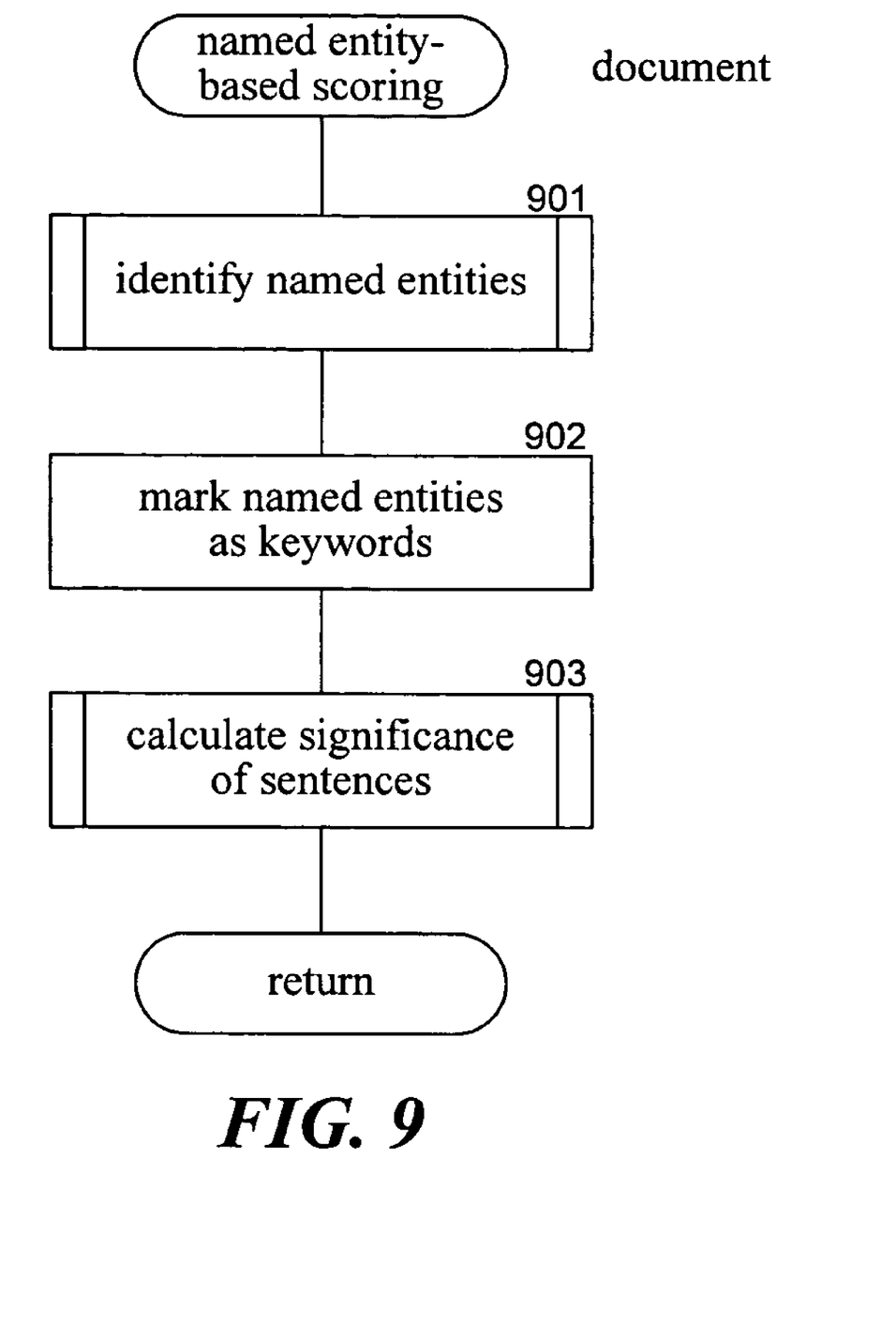
FIG. 9 is a flow diagram that illustrates the processing of a named entity-based scoring technique in one embodiment.

FIG. 9 is a flow diagram that illustrates the processing of a named entity-based scoring technique in one embodiment. The component is passed a document, identifies named entities as keywords, and calculates the significance of the sentences of the document based on the keywords. In block 901, the component invokes a component to identify the named entities of the document.

In block 902, the component marks the named entities as keywords. In block 903, the component invokes the calculate significance of sentences component to calculate the significance of the sentences of the document using the identified keywords. The component then returns.

Figure 10:
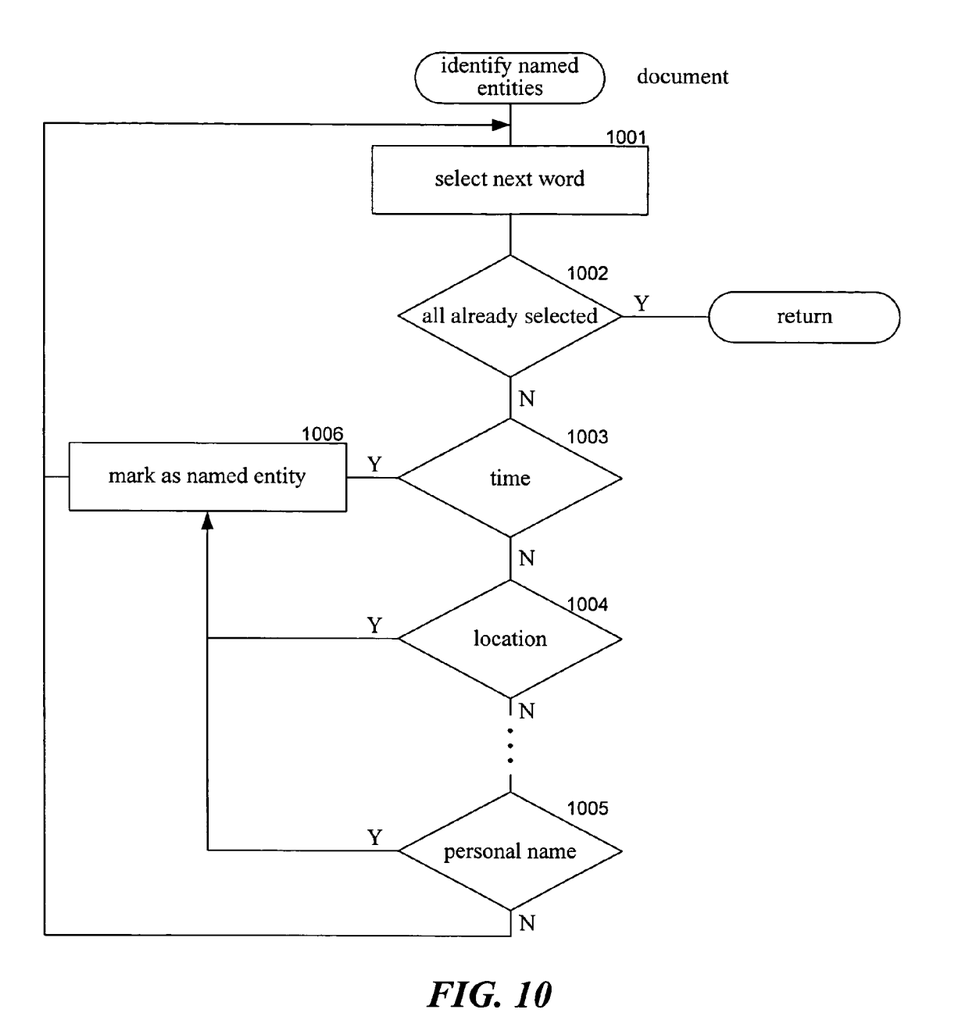
FIG. 10 is a flow diagram that illustrates the processing of a identify named entities component in one embodiment.

FIG. 10 is a flow diagram that illustrates the processing of an identify named entities component in one embodiment. The component is passed a document and returns a list of the named entities of the document. In block 1001, the component selects the next word of the document. In decision block 1002, if all the words have already been selected, then the component returns, else the component continues at block 1003. In decision blocks 1003-1005, the component checks whether the selected word is a named entity (e.g., time, location, or personal name). If so, the component marks the selected word as a named entity in block 1006. The component then loops to block 1001 to select the next word of the document.

Figure 11:
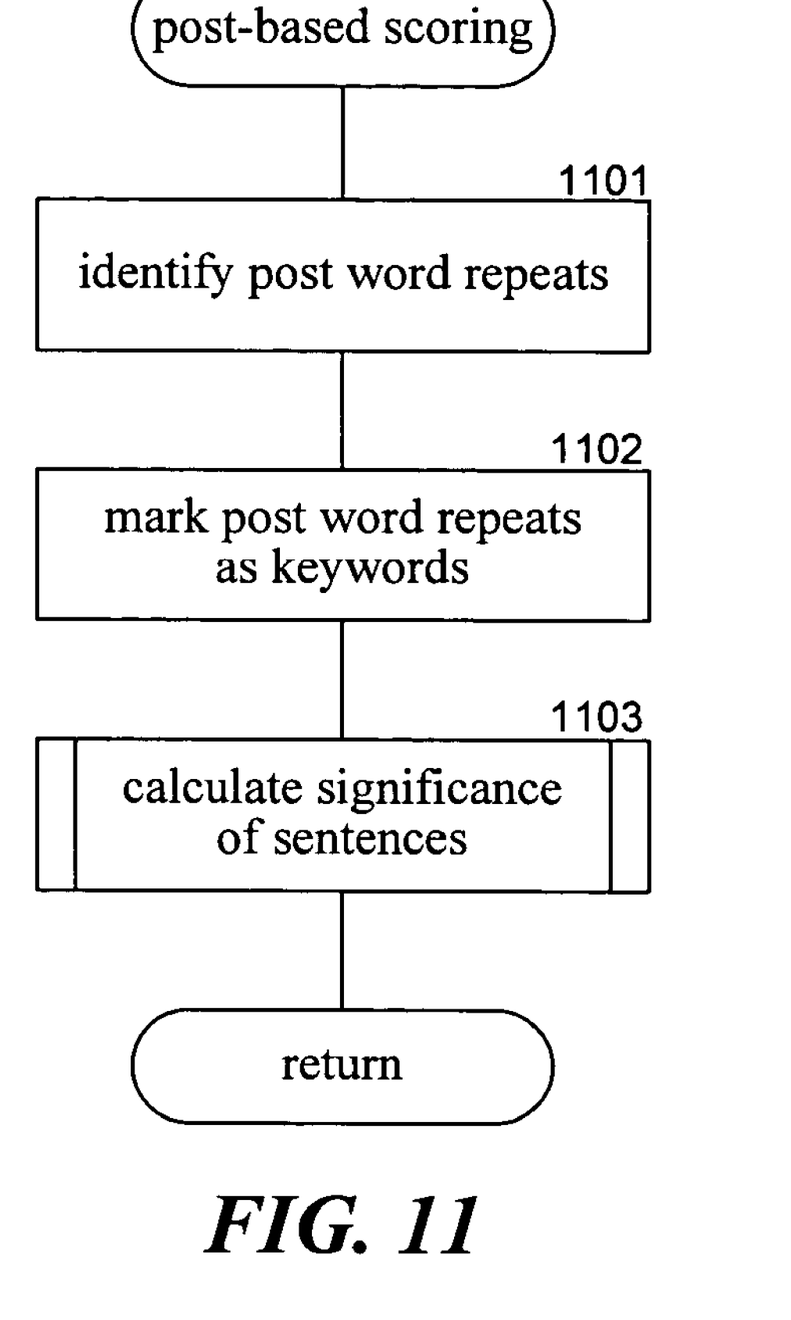
FIG. 11 is a flow diagram that illustrates the processing of a post repeat-based scoring technique in one embodiment.

FIG. 11 is a flow diagram that illustrates the processing of a post repeat-based scoring technique in one embodiment. The component is passed a document that is thread-based, identifies words in the current post that are a repeat of words in a previous post, and calculates the significance of sentences of the document based on the identified words. In block 1101, the component identifies words of the current post that are repeats of words in a previous post of the document. In block 1102, the component marks the identified words as keywords. In block 1103, the component invokes the calculate significance of sentences component to calculate the significance of the sentences of the document using the identified keywords. The component then returns.

One skilled in the art will appreciate that although specific embodiments of the summarization system have been described herein for purposes of illustration, various modifications may be made without deviating from the spirit and scope of the invention. For example, one skilled in the art will appreciate that many different scoring techniques can be used to generate a score indicating whether a keyword is important to a document. As an example, if the documents have keyword metadata, then the summarization system could add another feature to the feature vector for a metadata-based scoring technique. If a word is in the keyword metadata, then it can be given a very high score. Alternatively, the keywords of the metadata can be used by a Luhn-based algorithm to score the significance of sentences and then score the keywords of the sentences as described above. Also, various combinations of the scoring techniques may be used. For example, if the documents being scored are not thread-based, then a thread-based scoring technique would not be used. Accordingly, the invention is not limited except by the appended claims.

We claim:

1. A method in a computer system for identifying significant sentences of a document, the method comprising:
   providing a training set of training documents along with an indication of whether words of the training documents are important or not important as indicated by a person;
   for each training document, generating multiple scores for each word indicated as being important or not important using different scoring techniques to generate a technique-specific importance of the word to the training document;
   training a support vector machine classifier to classify words as important or not important to a document based on training data that includes the multiple scores for the words generated from different scoring techniques and the indications of whether the words are important or not important, the multiple scores for a word being a feature vector for the word, the training including finding a hyper-surface in a space represented by the feature vectors of the words that attempts to split feature vectors for words classified as important from feature vectors for words classified as not important;
   generating scores using the different scoring techniques for words of the document;
   identifying important words of the document using the trained support vector machine classifier to classify from the generated scores those words that are important to the document;
   calculating significance of sentences of the document based on the identified important words contained in the sentences; and
   storing an indication of the calculated significance of the documents.

2. The method of claim 1 including indicating a sentence as being significant to the document based on the calculated significance.

3. The method of claim 1 including generating a summary of the document from significant sentences of the document and outputting the generated summary as a summarization of the document.

4. The method of claim 1 wherein the scoring techniques are Luhn-based.

5. The method of claim 1 wherein the scoring techniques identify different keywords of a document and calculate significance of sentences based on the identified keywords.

6. The method of claim 5 wherein a scoring technique identifies a word of a document as a keyword based on frequency of occurrences of the word within the document.

7. The method of claim 5 wherein a scoring technique identifies a word of a document as a keyword based on a title of the document.

8. The method of claim 5 wherein a scoring technique identifies a word of a document as a keyword based on the word being a named entity.

9. The method of claim 5 wherein a document includes posts and a scoring technique identifies a word of a document as a keyword based on whether a word of a current post occurs in a previous post.

10. The method of claim 5 wherein the significance of a sentence is calculated using a Luhn-based algorithm.

11. The method of claim 1 wherein the document is an electronic mail message.

12. A computer-readable storage medium containing instructions for controlling a computer system to identify significant sentences of a document, by a method comprising:
    providing a classifier that is trained by
        providing a training set of training documents along with an indication of whether words of the document are important or not important as indicated by a person;
        for each training document, generating multiple scores for each word indicated as being important or not important using different scoring techniques to generate a technique-specific importance of the word to the training document, the multiple scores for each word forming a feature vector; and
        training a classifier to classify words as important or not important to a document based on the feature vectors representing the multiple scores for the words generated from different scoring techniques and based on the indications of whether the words are important or not important;
    generating scores using the different scoring techniques for words of the document, the multiple scores for a word of the document being a feature vector;
    identifying important words of the document using the classifier to classify from the feature vectors those words that are important to the document;
    calculating significance of sentences of the document based on the identified important words contained in the sentences; and
    storing an indication of the calculated significance of the documents.

13. The computer-readable storage medium of claim 12 including indicating a sentence as being significant to the document based on the calculated significance.

14. The computer-readable storage medium of claim 12 including generating a summary of the document from significant sentences of the document and outputting the generated summary as a summarization of the document.

15. The computer-readable storage medium of claim 12 wherein the scoring techniques are Luhn-based.

16. The computer-readable storage medium of claim 12 wherein the scoring techniques identify different keywords of a document and calculate significance of sentences based on the identified keywords.

17. The computer-readable storage medium of claim 16 wherein a scoring technique identifies a word of a document as a keyword based on frequency of occurrences of the word within the document.

18. The computer-readable storage medium of claim 16 wherein a scoring technique identifies a word of a document as a keyword based on a title of the document.

19. The computer-readable storage medium of claim 16 wherein a scoring technique identifies a word of a document as a keyword based on the word being a named entity.

20. The computer-readable storage medium of claim 16 wherein a document includes posts and a scoring technique identifies a word of a document as a keyword based on whether a word of a current post occurs in a previous post.

21. The computer-readable storage medium of claim 16 wherein the significance of a sentence is calculated using a Luhn-based algorithm.

22. The computer-readable storage medium of claim 12 wherein the document is an electronic mail message.

23. The computer-readable storage medium of claim 12 wherein the classifier is a support vector machine.

\* \* \* \* \*